United States Patent [19]

Casperson

[11] Patent Number: 4,486,398

[45] Date of Patent: Dec. 4, 1984

[54] FEEDSTOCK NOZZLE FOR LOW TINT RESIDUAL CARBON BLACK

[75] Inventor: John R. Casperson, Bartlesville, Okla.

[73] Assignee: Phillips Petroleum Company, Bartlesville, Okla.

[21] Appl. No.: 513,187

[22] Filed: Jul. 12, 1983

Related U.S. Application Data

[62] Division of Ser. No. 274,093, Jun. 16, 1981, Pat. No. 4,431,607.

[51] Int. Cl.$^3$ ............................ C01B 31/02; C09C 1/48
[52] U.S. Cl. .................................... 423/450; 423/456; 423/457
[58] Field of Search ............... 423/449, 450, 455, 456, 423/457

[56] References Cited

U.S. PATENT DOCUMENTS

| | | | |
|---|---|---|---|
| 2,957,755 | 10/1960 | Warner | 423/456 |
| 3,011,872 | 12/1961 | Webster | 422/156 |
| 3,046,096 | 7/1962 | Heller | 423/450 |
| 3,071,443 | 1/1963 | Bellew | 423/450 |
| 3,443,755 | 5/1969 | Briemont | 239/132.5 |
| 3,755,544 | 8/1973 | Gunnell | 423/450 |
| 3,865,925 | 2/1975 | Mills | 423/450 |
| 3,913,845 | 10/1975 | Tsuji | 239/567 |
| 3,923,465 | 12/1975 | Krejci | 423/450 |
| 4,014,654 | 3/1977 | Howell | 422/156 |
| 4,065,265 | 12/1977 | Chestnutt | 423/450 |
| 4,071,496 | 1/1978 | Kraus et al. | 423/450 |
| 4,093,421 | 6/1978 | Jerkins | 423/450 |
| 4,106,912 | 8/1978 | Dollinger et al. | 422/151 |
| 4,179,494 | 12/1979 | Rothbuhr et al. | 423/450 |
| 4,206,176 | 6/1980 | Vanderveen | 422/157 |
| 4,228,131 | 10/1980 | Rothbuhr et al. | 422/156 |
| 4,230,670 | 10/1980 | Forseth | 422/151 |

*Primary Examiner*—Gregory A. Heller
*Attorney, Agent, or Firm*—A. W. Umphlett

[57] ABSTRACT

A pipe, containing a multiplicity of spray ports spaced longitudinally along the pipe so that carbonaceous feedstock can be simultaneously ejected from the ports outwardly from the pipe, is adapted for concentric longitudinal, axial alignment in a carbon black reactor. Preferably the pipe is jacketed so that coolant fluid can be circulated through the annulus formed between the pipe and the jacket and conduit means provide a connection from the pipe to spray ports located in the jacket wall thereby providing means for ejecting carbonaceous feedstock outwardly from the jacketed pipe. A carbon black reactor containing a feedstock nozzle as described above with the nozzle adapted to eject hydrocarbon feedstock into either a precombustion or a combustion zone of the reactor. A method for producing carbon black in which hydrocarbon feedstock is introduced into either a precombustion or a combustion zone of a carbon black reactor through a feedstock nozzle as described above.

11 Claims, 6 Drawing Figures

FEEDSTOCK NOZZLE FOR LOW TINT RESIDUAL CARBON BLACK

BACKGROUND OF THE INVENTION

This application is a divisional application of my copending application, Ser. No. 274,093, filed June 16, 1981, now U.S. Pat. No. 4,431,607.

This invention relates to carbon black production. In one of its aspects this invention relates to carbon black reactors. In another of its aspects this invention relates to the introduction of carbonaceous feedstock into a carbon black reactor. And still another aspect the invention relates to a feedstock nozzle for the introduction of feedstock into a carbon black reactor.

It has been disclosed in U.S. Pat. No. 4,071,496 that the incorporation of a carbon black with a low tint residual, preferably below minus 6, into a rubber composition causes the hysteresis, or heat buildup, of such a rubber composition to be significantly lower than that of a rubber composition incorporating a carbon black with a higher tint residual, while the abrasion resistance of such rubber compositions incorporating these different carbon blacks remains essentially the same. Great importance has, therefore, been placed upon the discovery of methods and apparatuses that are capable of producing a carbon black having low tint residual.

Tint residual is the difference between the measured tint and the tint calculated from the structure, nitrogen surface area and CTAB surface area in accordance with a specific formula.

$$TR = T - [56.0 + 1.057(CTAB) - 0.002745(CTAB)^2 - 0.2596(DBP)0.201(N_2SA - CTAB)]$$

In this formula the abbreviations used have the following meanings and the properties are measured as described:

TR: This is tint residual.

CTAB: This is the surface area of the carbon black measured in accordance with ASTM D3765-79, $m^2/gr$.

$N_2SA$: This is the surface area of the carbon black measured using nitrogen in accordance with the ASTM method D-3037-71T, $m^2/gm$.

Compressed DBP: This is the structure of the carbon black in cc/100 g and is measured in accordance with ASTM D3493-76. This property is also referred to as 24 M4 DBP.

T: This is the tint or tinting strength of the carbon black relative to the industrial reference black IRB No. 3 which has the value of 100. Tint is measured in accordance with ASTM 3265-75. The surface area, as described above as CTAB and $N_2SA$ is usually an inverse measurement of the nodule size of the carbon black. The structure of the carbon black, expressed above as compressed DBP, is a measure of the complexity of the individual carbon black aggregates or of the number of nodules "fused" together in one carbon black aggregate.

It is therefore an object of this invention to provide a feedstock nozzle suitable for use in the carbon black reactor. It is another object of this invention to provide a carbon black reactor equipped with means for producing low tint residual carbon black. It is still another object of this invention to provide a method for producing low tint residual carbon black.

Other aspects, objects and the various advantages of this invention will become apparent upon a study of this specification, the drawing, and the appended claims.

STATEMENT OF THE INVENTION

According to this invention, a carbon black reactor feedstock nozzle is provided in which a pipe, containing a multiplicity of spray ports spaced longitudinally along the pipe with the spray ports capable of simultaneously injecting carbonaceous feedstock outwardly from the pipe, is adapted for a concentric longitudinal, axial alignment in a carbon black reactor.

Preferably, the pipe, as described above, is jacketed with another pipe so that coolant fluid can be circulated through the annulus formed between the pipe and the jacket and with conduit means connecting the pipe spray ports to the spray ports located in the jacket wall thereby enabling carbonaceous feedstock to be ejected outwardly from the jacket wall.

In an embodiment of the invention a carbon black reactor is provided in which a nozzle as described above is positioned to discharge in a precombustion and or a combustion zone of the carbon black reactor.

And still another embodiment of the invention a method is provided for producing carbon black by ejecting carbonaceous feedstock outwardly from the above-described feedstock nozzle positioned in a concentric longitudinal, axial alignment within a carbon black reactor.

The carbon black reactor feedstock nozzles contemplated by this invention are generally those that are inserted in a carbon black reactor so that the alignment is generally concentric, axial and longitudinal with the carbon black reactor. The spray portion of the nozzle is positioned to discharge a spray of carbonaceous feedstock in a precombustion and or a combustion zone of the reactor.

The arrangement of the openings from which spray issues from the nozzle can be in any pattern or can be a random scattering of openings along the length of the portion of the nozzle lying within the desired zone of the reactor with the proviso that feedstock should be sprayed generally to produce gradients of concentration of the reactants within the reactor. By using a simultaneous outward spraying of feedstock at intervals along the length of the axis of a carbon black reactor a wide distribution of aggregate carbon black volumes, e.g., a wide distribution of CTAB, $N_2SA$ and/or DBP, as defined above, between individual carbon black particles, is produced in the reactor. It should be pointed out that in describing the ejection of carbonaceous feedstock into the reactor as "outward" there is no intention to restrict the flow to be perpendicular to the axis of the reactor. Ejection at any angle that has a component not parallel to the axis of the reactor is within the contemplation of this invention. It is preferred because of ease of manufacture, however, that the spray ports open outwardly from the pipe in a direction generally normal to the longitudinal axis of the pipe and the flow passage of the reactor.

The high temperatures required in carbon black reactors necessitate the consideration of means for providing cooling of any nozzle that forms a projection within a reactor. The nozzles contemplated here can utilize any means generally known in the art for cooling sparger pipes inserted into high temperature environments. The presently preferred means for cooling the spray nozzles is to provide a jacket through which a coolant fluid is circulated. At present, the preferred coolant liquid is water, although any easily circulated fluid can be useful.

The invention can best be understood in conjuction with the drawing in which FIG. 1 is a cutaway side view of a preferred embodiment of a feedstock nozzle;

Figure 1:
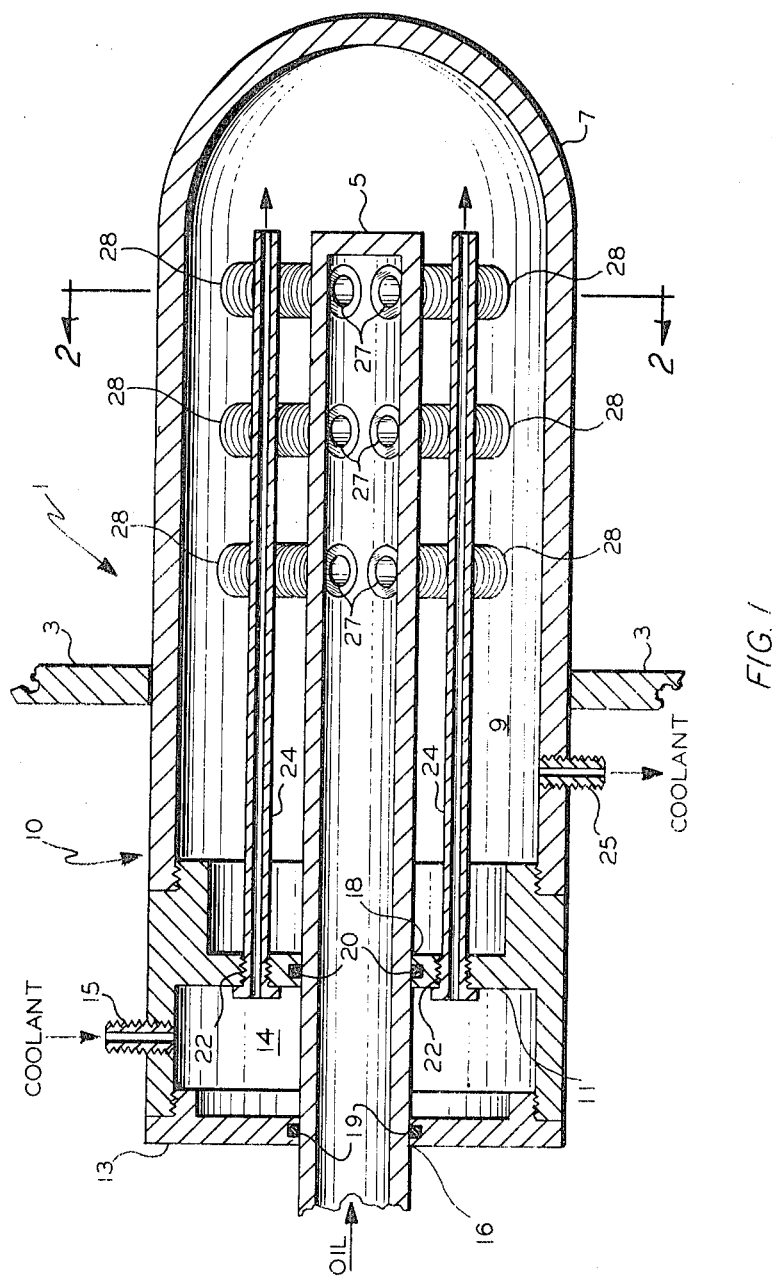
Figure 2:
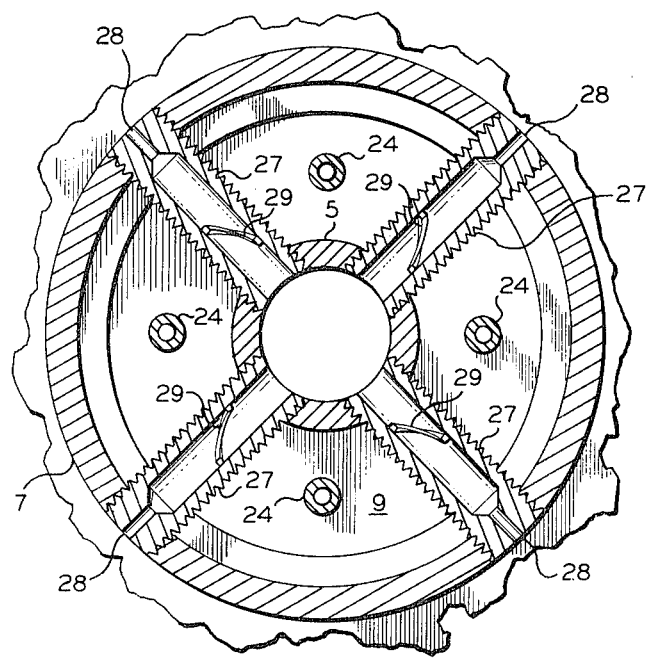
FIG. 2 is a sectional view (cut line 2—2) of the nozzle of FIG. 1.

Referring now to the drawing, the apparatus and method of using the apparatus will be discussed, at all times using like numbers to describe like portions of the apparatus in discussing different figures. In FIGS. 1 and 2, a reactor feedstock nozzle 1 is inserted through the wall 3 of a carbon black reactor so that the nozzle is aligned concentrically, axially, and longitudinally with the carbon black reactor. The spray nozzle has a central pipe 5 for carrying feedstock which is surrounded by a closed jacket 7 so that there is formed between the outside of the central pipe 5 and the inside of the jacket 7 an annulus 9 through which coolant fluid can be circulated.

Attached to the oil inlet end 10 is closure means 11 and end cover 13. Closure means 11 and end cover 13 form a zone 14 into which cooling fluid for the nozzle 1 is introduced through inlet 15. End cover 13 has a central passageway 16 through which central pipe 5 is positioned. Closure 11 also has a central passageway 18, in alignment with passageway 16, through which central pipe 5 is also positioned. Seal means 19 and 20 are positioned between pipe 5 and means 11 and 13, respectively. Means 19 and 20 can be O-rings or the equivalent. Optionally, seal means 20 can be omitted and a slip fit between pipe 5 and closure means 11 can be used.

Affixed in closure means 11 at 22 are cooling fluid conduits 24 which allow communication between zone 14 and annulus 9. Conduits 24 are open at each end for passage of cooling fluid. Coolant exits annulus 9 by way of conduit 25.

As shown in FIGS. 1 and 2, carbon black reactor feedstock enters the central pipe 5 and is conducted through conduit means 27 to spray ports or orifices 28, from which the feedstock is conducted into the carbon black forming zone.

Conduit means 27 are threadedly affixed to jacket 7 and to central pipe 5. Conventional swirl means 29 are preferably used in the conduit or nozzle means 27.

Figure 5:
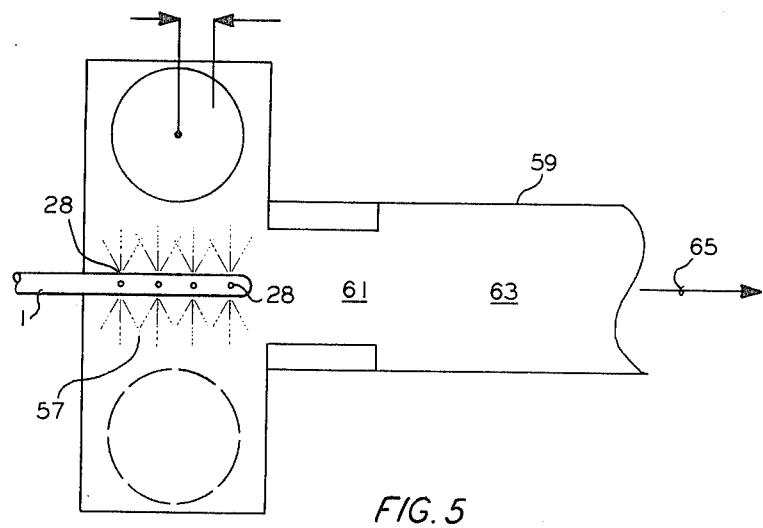
FIG. 5 is a cutaway side view of the carbon black reactor with feedstock nozzle inserted in a precombustion zone.
Figure 6:
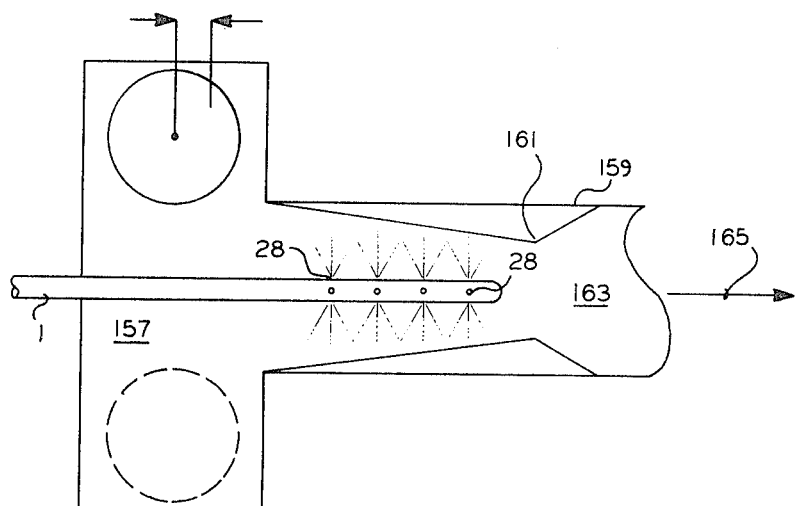
FIG. 6 is a cutaway side view of a carbon black reactor with a feedstock nozzle inserted in the Venturi converging zone.

In operation, feedstock enters central pipe 5 and passes through conduit 27 and ports or orifices 28 as a spray into the carbon black reactor (see FIGS. 5 and 6). To provide cooling for the nozzle means 1, cooling fluid such as water enters nozzle means 1 through conduit 15, passes into zone 14, and by way of conduits 24 into and through annulus 9. The used cooling fluid exits the nozzle means 1 through conduit 25.

Nozzle means 1 is assembled as follows: closure means 11, with or without conduits 24 affixed, e.g., threaded, thereto (conduits 24 can be added after closure means is affixed to jacket 7) is affixed, e.g., threaded, to jacket 7 (jacket 7 can have conduit 25 affixed thereto, e.g., threaded, before or after it is assembled); end cover 13 is affixed to closure means 11 (conduit 15 can be inserted, e.g., threaded, before or after cover plate 13 is installed); central pipe 5 is inserted into the above assembly using passageways 16 and 18; seal ring, e.g., O-ring, or the like seal means 1 is used in this illustrative method of assembling nozzle means 1; seal means 20 is not used; central pipe 5 is rotated on its longitudinal axis to align the openings in central pipe 5 with corresponding openings in jacket 7 so that conduits 27, or nozzle means, can be affixed by such means as threading conduit means to the openings both in central pipe 5 and jacket 7.

Nozzle means 1 is now fully assembled and is inserted into the carbon black reactor face 3 (see FIGS. 5 and 6), coolant inlet conduit 15 is connected to its cooling fluid source (not shown) and cooling fluid outlet conduit 25 is connected to a disposal source (not shown). The inlet end of oil feed central pipe 5 is connected to a feedstock source (not shown).

Figure 3:
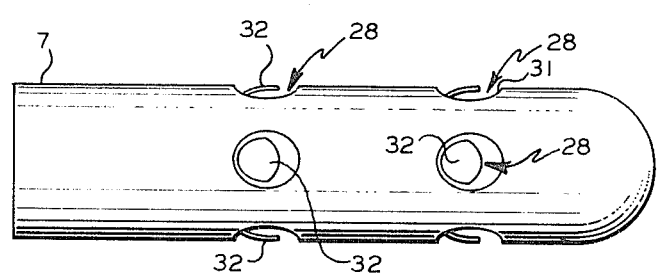
FIG. 3 is a side view of a nozzle showing spray port arrangement.

FIG. 3 describes a view of the feedstock nozzle 1 showing the outside of the jacket 7 with spray ports 28 arranged with slotted delivery channels 31 with deflectors 32 so that feedstock is sprayed at an angle other than 90 degrees from the axis of the feedstock nozzle. Although not shown, the spray ports 28 can be arranged around the outside of the jacket 7 in a helical pattern with the sprays directed 90 degrees from the axis of the nozzle, or at an angle other than 90°.

Figure 4:
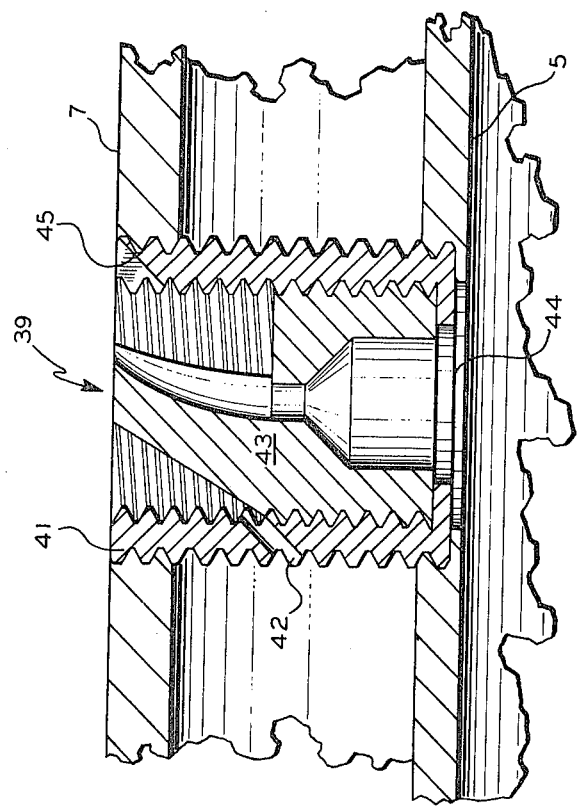
FIG. 4 is a sectional view of a portion of the nozzle of FIG. 3.

FIG. 4 illustrates a nozzle which emits a flat oil spray pattern. Nozzle unit 39 is mounted into both central pipe 5 and jacket 7, for example, by using thread means 41. Aperture 42 is located in unit 39 to allow passage of cooling air which impinges on oil deflector 43 on the surface away from the oil contact, the oil entering at 44. The downstream edge of the nozzle, facing deflector 43 is bevelled at 45 to prevent its hindering the oil flow pattern.

In FIG. 5 a feedstock nozzle 1 is inserted into the precombustion zone 57 of a carbon black reactor 59. The precombustion zone has a typical tangential entry of fuel and combustion gas so that a rotating mass of combustion fluids is provided in the precombustion zone 57 into which is directly sprayed hydrocarbon feedstock from a multiplicity of spray ports 28 placed along the spray nozzle 1. This injection of the carbonaceous feedstock simultaneously at a series of positions along the longitudinal access of the reactor produces gradients of concentration of the reactants in the rotating mass of combustion gases which as the mixture is carried into the zones 61, 63 produces a low or negative tint residual carbon black. The carbon black product is collected and removed from the reactor through product line 65 for further treatment.

Similarly, as shown in FIG. 6, the feedstock nozzle 1 can be inserted into the carbon black reactor 159 so that hydrocarbon feedstock is sprayed from spray ports 28 simultaneously in a series of positions along the longitudinal axis of the reactor in zone 161. In this manner the rotating mass of combustion gases produced in precombustion zone 157 are first contacted with the carbonaceous feedstock in a reaction zone so that gradients of concentration of reactant are produced which result in a negative or low tint residual carbon black as the mass passes on through zone 163 and the product is collected in the product line 165.

TABLE I

Run Data Illustrating Actual
Effect of Nozzle Position
on Carbon Black Properties

| | | | | |
|---|---|---|---|---|
| (a) Oil Nozzle Oil Outlet Position, inches | 0 | 4 | 8 | 12 |
| (b) Oil Rate, gal/hr., | 347 | 353 | 347 | 349 |
| Tangential Air, MSCF/hr., | 209.1 | 209.1 | 209.1 | 209.1 |
| Air Temperature, °F., | 362 | 360 | 362 | 362 |
| (c) Tangential Gas, MSCF/hr., | 11.76 | 11.85 | 11.83 | 12.00 |
| Carbon Black Yield, lbs./gal., | 4.71 | 4.64 | 4.31 | 4.53 |
| $N_2SA$, $m^2gm$, | 106.3 | 111.7 | 117.6 | 117.5 |
| CTAB, $m^2/gm$, | 95.3 | 106.4 | 110.8 | 111.5 |
| Compressed (24M4) DBP, cc/100 gm, | 116.9 | 110.1 | 106.3 | 102.2 |
| Tint Strength, | 102.1 | 110.3 | 115.2 | 118.1 |

(a) 0 inches is flush with upstream face of precombustion zone which has a length of 12 inches and a diameter of 24 inches. 12 inches is at the downstream face of the precombustion zone;
(b) API @ 60° F. of −0.5; BMCI of 123;
(c) Natural gas of about 1000 Btu/1000 SCF.

The reactor inlet was a venturi. The inlet diameter of the venturi was 15 inches, and the throat diameter of the venturi was 8 inches. The converging length of the venturi was about 15 inches.

Table I illustrates the effects of oil nozzle position on CTAB, $N_2SA$, and compressed (24M4) DBP values. The instant invention takes advantage of the oil injection locus effect on these properties to produce a broad spectrum or range of nodule or particle sizes, and to also produce a broad spectrum or range of aggregate sizes for the production of low or negative tint residual carbon black product.

Invention is illustrated (see FIG. 5) in the following calculated example:

TABLE II

| FLOW RATES: | |
|---|---|
| Tangential Air (Total), SCF/hr, | 220,000 |
| Temperature, °F., | 800 |
| Tangential Fuel ($CH_4$), SCF/hr, | 13,000 |
| Temperature, °F., | 100 |
| Axial Oil (Total), gallons/hr | (a) 400 |
| (Divided into 16 equal streams) (b) | |
| Temperature, °F. | 450 |
| Quench Water, gallons/hr, | 100 |
| Temperature, °F., | 100 |
| Pounds N330 Carbon Black/hr, | 2,100 |
| REACTOR DIMENSIONS: | |
| Precombustion Zone (PCZ): | |
| Diameter, inches | 24 |
| Length, inches | 12 |
| Reaction Zone: | |
| Diameter, inches | 12 |
| Length, inches | (c) 50 |
| Choke (cylindrical): | |
| Length, inches | 12 |
| Diameter, inches | 10 |

(a) 110 BMCI; 600° F. MID-BOILING POINT;
(b) Apertures sets are spaced at 2.5 inches along oil tube; each set with four apertures at 90 degrees spacing around the oil tube; 90 degrees injection direction of oil streams or sprays.
(c) From downstream face of PCZ to quench injection locus.

Additional information relating tint residual to aggregate size distribution and nodule size distribution is detailed in *Rubber Chemistry and Technology*, Volume 48, No. 4, September-October, 1975, pages 538 through 547. This above-referred-to publication is incorporated herein by reference.

I claim:

1. A method for producing carbon black comprising:
   (1) introducing hydrocarbon feedstock into a precombustion zone of a carbon black reactor through a feedstock nozzle positioned in concentric, longitudinal, axial alignment in said precombustion zone said feedstock nozzle comprising;
   (a) a first pipe closed at the downstream end and containing a multiplicity of ports spaced longitudinally along said pipe,
   (b) a second pipe, jacketing said first pipe, closed at the downstream end and of sufficiently greater diameter than said first pipe to provide an annular space therebetween and having spray ports thereon aligned with said spray ports on said first pipe with
   (c) conduits extending radially through said annular space from said first pipe to said second pipe connecting each port on said first pipe with a port on said second pipe and
   (d) inlet and outlet means for passing coolant through said annular space around said conduit so that said coolant directly contacts substantially the entire outer surface of each conduit;
   (2) contacting said feedstock in said precombustion zone with a rotating mass of combustion gas and subjecting said feedstock and combustion gas to conditions suitable to produce carbon black; and
   (3) collecting and removing said carbon black from said reactor.

2. A method of claim 1 wherein said spray ports are arranged in a spaced pattern on the cylindrical length of said first and second pipes.

3. A method of claim 1 wherein said spray port openings are adapted to direct spray 90 degrees radially from the axis of said nozzle.

4. A method of claim 1 wherein said spray port openings are adapted to direct spray at angles of other than 90 degrees radially from the axis of said nozzle.

5. A method of claim 1 wherein said annulus is divided longitudinally by a baffle with (1) means for supplying coolant on one side of said baffle and (2) means for removing coolant on the other side of said baffle near the same end of the nozzle and (3) means for passing coolant from the inlet side of the annulus to the exit side of the annulus at the opposite end of said nozzle from the inlet/outlet.

6. A method of claim 1 wherein said inlet means for passing coolant through said annular space comprises at least one inlet conduit extending from a coolant supply through said annular space to discharge into the zone of the annular space between the closed end of said first pipe and the closed end of said second pipe with outlet means for coolant near the end of said jacketed pipe furthest removed from the zone into which coolant is discharged into the annular space.

7. A method for producing carbon black comprising:
(1) introducing hydrocarbon feedstock into a precombustion zone of a carbon black reactor through a feedstock nozzle positioned in concentric, longitudinal, axial alignment in said precombustion zone said feedstock nozzle comprising;
 (a) a first pipe closed at the downstream end and containing a multiplicity of ports spaced longitudinally along said pipe,
 (b) a second pipe, jacketing said first pipe, closed at the downstream end and of sufficiently greater diameter than said first pipe to provide an annular space therebetween and having spray ports thereon aligned with said spray ports on said first pipe with
 (c) conduits extending radially through said annular space from said first pipe to said second pipe connecting each port on said first pipe with a port on said second pipe and
 (d) inlet and outlet means for passing coolant through said annular space around said conduit so that said coolant directly contacts substantially the entire outer surface of each conduit;
(2) contacting said feedstock in said precombustion zone with a rotating mass of combustion gas and subjecting said feedstock and combustion gas to conditions suitable to produce carbon black; and
(3) collecting and removing said carbon black from said reactor.

8. A method of claim 7 wherein said spray ports are arranged in a spaced pattern on the cylindrical length of said first and second pipes.

9. A method of claim 7 wherein said spray port openings are adapted to direct spray 90 degrees radially from the axis of said nozzle.

10. A method of claim 7 wherein said spray port openings are adapted to direct spray at angles of other than 90 degrees radially from the axis of said nozzle.

11. A method of claim 7 wherein said annulus is divided longitudinally by a baffle with (1) means for supplying coolant on one side of said baffle and (2) means for removing coolant on the other side of said baffle near the same end of the nozzle and (3) means for passing coolant from the inlet side of the annulus to the exit side of the annulus at the opposite end of said nozzle from the inlet/outlet.

* * * * *